US011075760B1

(12) United States Patent
Bachenheimer et al.

(10) Patent No.: US 11,075,760 B1
(45) Date of Patent: Jul. 27, 2021

(54) UTILIZING VOICE BIOMETRICS TO GENERATE A SECURE DIGITAL IDENTITY FOR A USER WITHOUT ACCESS TO TECHNOLOGY

(71) Applicant: Accenture Global Solutions Limited, Dublin (IE)

(72) Inventors: Daniel Bachenheimer, Silver Spring, MD (US); Thomas Jean Georges M. Moretti, Nice (FR); Anne Alice Germaine Groeppelin, Mouans-Sartoux (FR); Giuseppe Giordano, Antibes (FR); Luca Schiatti, Juan les Pins (FR); Abdoulaye Faye, Valbonne (FR)

(73) Assignee: Accenture Global Solutions Limited, Dublin (IE)

( * ) Notice: Subject to any disclaimer, the term of this patent is extended or adjusted under 35 U.S.C. 154(b) by 0 days.

(21) Appl. No.: 17/110,657

(22) Filed: Dec. 3, 2020

(30) Foreign Application Priority Data

Aug. 10, 2020 (EP) .................................. EP20290059

(51) Int. Cl.
*G06F 21/00* (2013.01)
*H04L 9/32* (2006.01)
(Continued)

(52) U.S. Cl.
CPC ............ *H04L 9/3231* (2013.01); *G10L 17/24* (2013.01); *H04L 9/0825* (2013.01); *H04L 9/0866* (2013.01); *H04L 9/0894* (2013.01)

(58) Field of Classification Search
CPC ... H04L 9/3231; H04L 9/0866; H04L 9/0825; H04L 9/0894; G10L 17/24
See application file for complete search history.

(56) References Cited

U.S. PATENT DOCUMENTS

| 10,868,672 | B1 * | 12/2020 | Farrugia | H04L 9/3231 |
| 2013/0262873 | A1 * | 10/2013 | Read | H04W 12/06 |
| | | | | 713/186 |

(Continued)

OTHER PUBLICATIONS

Monrose, F., Reiter, M. K., Li, Q., & Wetzel, S. (May 2000). Cryptographic key generation from voice. In Proceedings 2001 IEEE Symposium on Security and Privacy. S&P 2001 (pp. 202-213). IEEE. (Year: 2001).*

(Continued)

*Primary Examiner* — Alexander Lagor
(74) *Attorney, Agent, or Firm* — Harrity & Harrity, LLP

(57) ABSTRACT

In some implementations, a system may generate information that identifies a passphrase to be used as a biometric input. The system may receive a voice input of a user speaking the passphrase. The system may generate one or more cryptographic keys based on the voice input. The system may generate a digital identifier based on the one or more cryptographic keys. The system may generate one or more biometric templates for the user. The system may encrypt the one or more biometric templates using the one or more cryptographic keys and to generate one or more encrypted biometric templates. The system may store in a secure storage associated with the user, at least one of the digital identifier, a public key of the one or more cryptographic keys, a phone number associated with the user, or the one or more encrypted biometric templates. Numerous other aspects are provided.

20 Claims, 9 Drawing Sheets

(51) Int. Cl.
*H04L 9/08* (2006.01)
*G10L 17/24* (2013.01)

(56) References Cited

U.S. PATENT DOCUMENTS

2020/0168229 A1* 5/2020 Manchireddy ..... G06Q 20/3278
2020/0366488 A1* 11/2020 Andersson ............ H04L 9/0819

OTHER PUBLICATIONS

Dodis, Y., Reyzin, L., & Extractors, A. S. F. (2004). How to Generate Strong Keys from Biometrics and Other Noisy, Data Apr. 13. EUROCRYPT. (Year: 2004).*
Li, Nan, et al., "Fuzzy Extractors for Biometric Identifification," 2017, Faculty of Engineering and Information Sciences—Papers: Part B. 697, 13 pages.
Dodis, Yevgeniy, et al., "Fuzzy Extractors: How to Generate Strong Keys from Biometrics and Other Noisy Data," Jan. 20, 2008, SIAM Journal on Computing, 47 pages.
Monrose, Fabian, et al., "Using Voice to Generate Cryptographic Keys," 2001, Odyssey 2001, 6 pages.

* cited by examiner

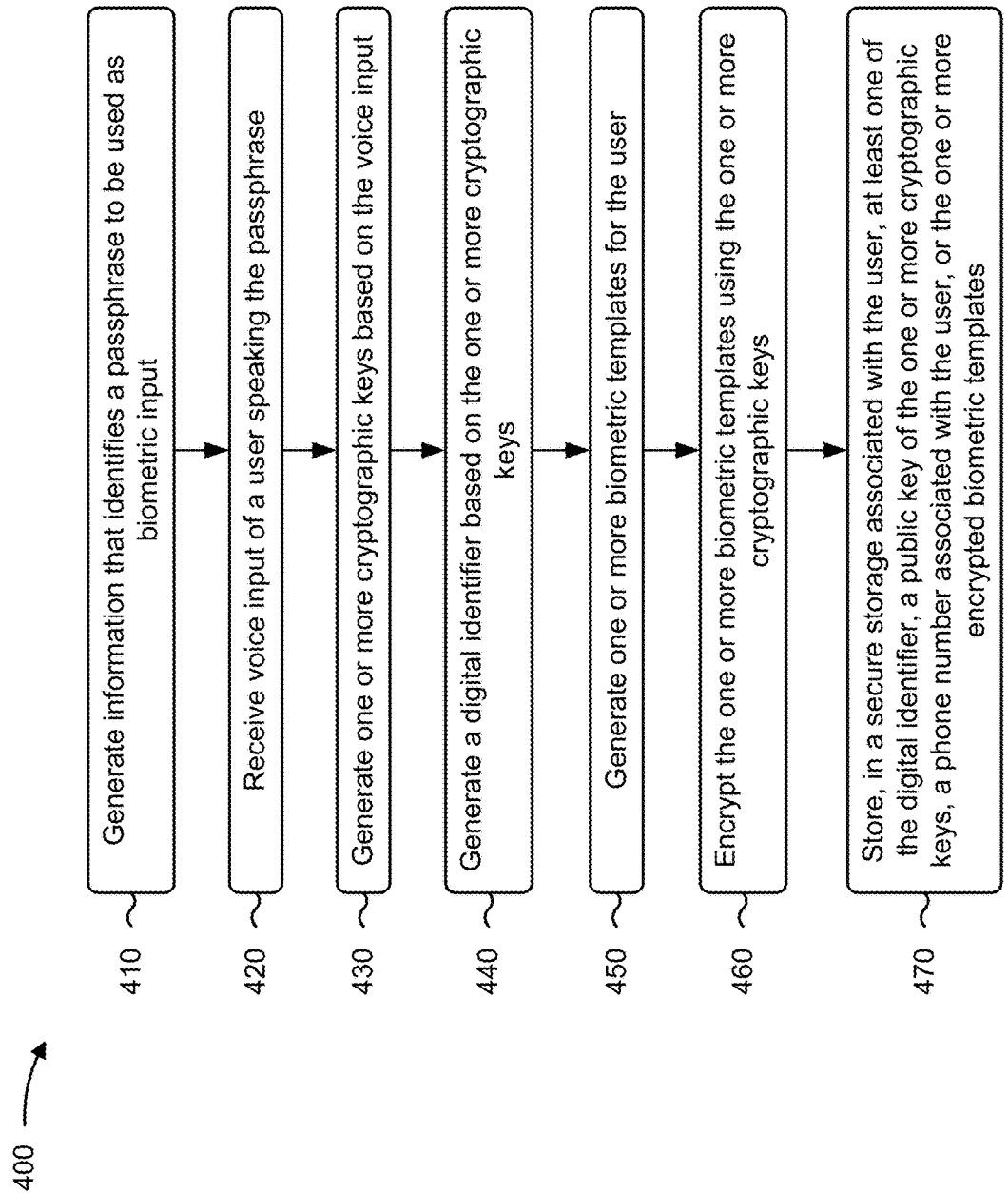

UTILIZING VOICE BIOMETRICS TO GENERATE A SECURE DIGITAL IDENTITY FOR A USER WITHOUT ACCESS TO TECHNOLOGY

CROSS-REFERENCE TO RELATED APPLICATION

This Patent Application claims priority to European Patent Application No. 20290059.3, filed on Aug. 10, 2020, and entitled "VOICE BIOMETRICS." The disclosure of the prior Application is considered part of and is incorporated by reference into this Patent Application.

BACKGROUND

Identity verification involves one or more actions taken to confirm an identity of a user. For example, identity verification may include directing the user to complete a task to confirm the identity of the user. The task may include providing authentication information, such as a government issued identification card (e.g., a passport or a driver's license), a username, a password, a personal identification number (PIN), or another type of authentication information.

SUMMARY

In some implementations, a method includes generating, by a system, information that identifies a passphrase to be used as a biometric input; receiving, by the system, a voice input of a user speaking the passphrase; generating, by the system, one or more cryptographic keys based on the voice input; generating, by the system, a digital identifier based on the one or more cryptographic keys; generating, by the system, one or more biometric templates for the user; encrypting, by the system, the one or more biometric templates using the one or more cryptographic keys and to generate one or more encrypted biometric templates; and storing, by the system, in a secure storage associated with the user, at least one of the digital identifier, a public key of the one or more cryptographic keys, a phone number associated with the user, or the one or more encrypted biometric templates.

In some implementations, a system includes one or more memories; and one or more processors, communicatively coupled to the one or more memories, configured to: generate information that identifies a passphrase to be used as a biometric input; receive a voice input of a user speaking the passphrase; generate one or more cryptographic keys based on the voice input and using a fuzzy extractor technique, wherein the one or more cryptographic keys include a public key and a corresponding private key; generate a digital identifier based on the one or more cryptographic keys; generate one or more biometric templates for the user; encrypt the one or more biometric templates using the one or more cryptographic keys and to generate one or more encrypted biometric templates; and store, in a secure storage associated with the user, at least one of the digital identifier, a public key of the one or more cryptographic keys, a phone number associated with the user, or the one or more encrypted biometric templates.

In some implementations, a non-transitory computer-readable medium storing a set of instructions includes one or more instructions that, when executed by one or more processors of a system, cause the system to: receive, via interaction with a user, a request for a digital identifier for the user; generate, based on the request, information that identifies a passphrase to be used as a biometric input; provide, via interaction with the user, information instructing the user to speak the passphrase; receive a voice input of the user speaking the passphrase; generate one or more cryptographic keys based on the voice input; generate a digital identifier based on the one or more cryptographic keys; generate one or more biometric templates for the user; encrypt the one or more biometric templates using the one or more cryptographic keys and to generate one or more encrypted biometric templates; and store, in a secure storage associated with the user, at least one of the digital identifier, a public key of the one or more cryptographic keys, a phone number associated with the user, or the one or more encrypted biometric templates.

BRIEF DESCRIPTION OF THE DRAWINGS

FIG. 4 is a flowchart of an example process relating to utilizing voice biometrics to generate a secure digital identity for a user.

DETAILED DESCRIPTION

Figure 1A:
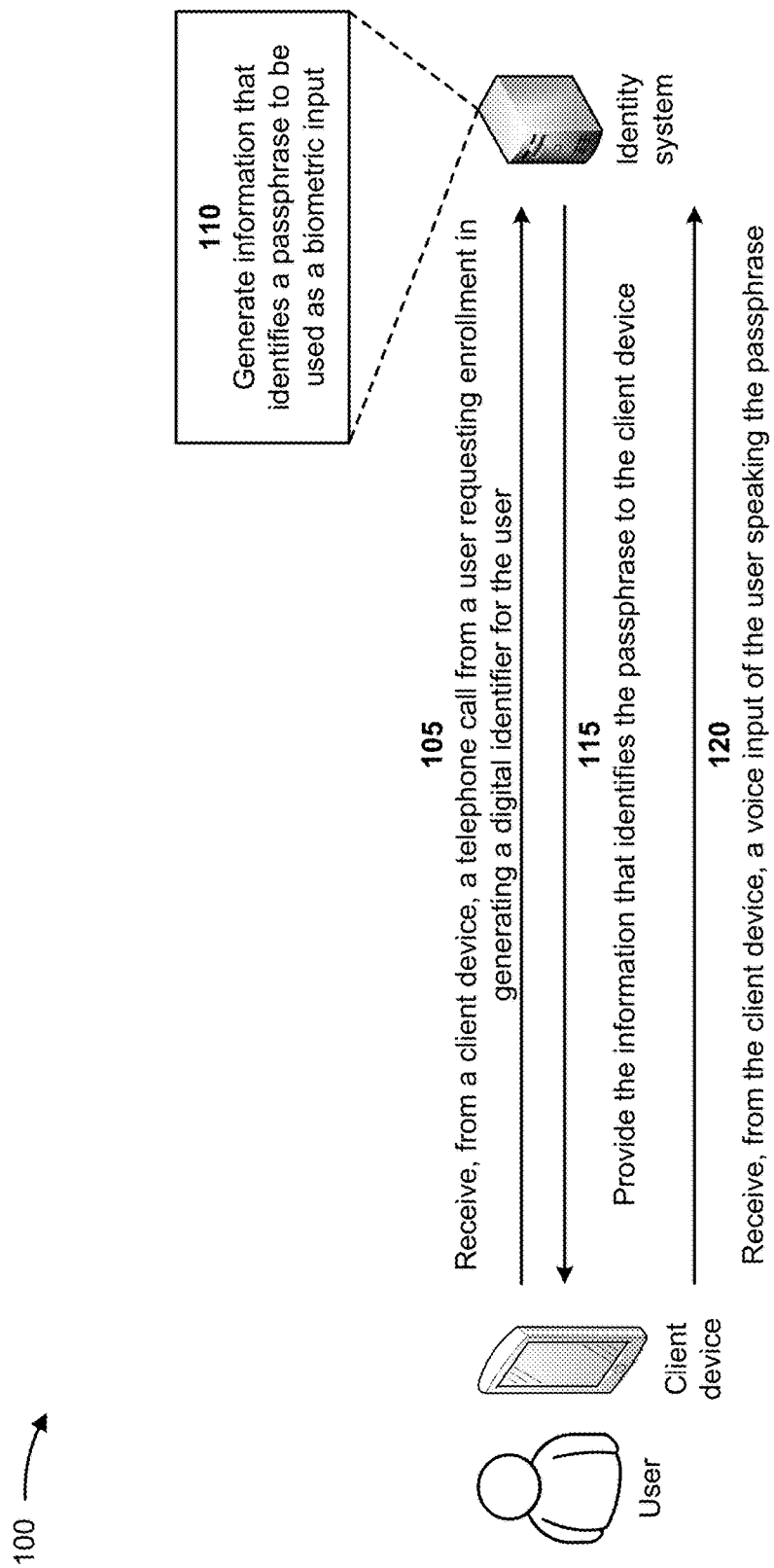
FIGS. 1A-1F are diagrams of an example implementation described herein.

The following detailed description of example implementations refers to the accompanying drawings. The same reference numbers in different drawings may identify the same or similar elements.

A person may be required to verify the person's identity to an entity in order to obtain various services and/or perform certain functions. For example, to establish an account with a financial institution, to vote in a governmental election, and/or to obtain a governmental service, a person may be required to provide authentication information (e.g., a government issued identification card, a username, a password, a PIN, and/or the like) that can be used to verify the person's identity.

In some cases, the person may not have and/or may not be able to obtain the required authentication information. For example, the person's level of education may prohibit the person from being able to fill out forms necessary to obtain the required authentication information. As another example, an entity may utilize a digital identity verification system, and the person's economic level may prohibit the person from obtaining a device necessary to utilize the digital identity verification system. In these cases, the person may not be able to access services and/or functions that may be beneficial to the person. For example, the person may not be able to obtain a driver's license, vote in a governmental election, and/or the like.

Some implementations described herein relate to an identity system that utilizes voice biometrics to generate a secure digital identity for a user. In some implementations, the identity system may generate information that identifies a passphrase to be used as a biometric input. The identity system may receive a voice input of a user speaking the passphrase. The identity system may generate one or more cryptographic keys based on the voice input. The identity system may generate a digital identifier based on the one or more cryptographic keys. The identity system may generate one or more biometric templates for the user. The identity system may encrypt the one or more biometric templates using the one or more cryptographic keys to generate one or more encrypted biometric templates. The identity system may store, in a secure storage associated with the user, the digital identifier, a public key of the one or more cryptographic keys, a phone number associated with the user, and/or the one or more encrypted biometric templates.

The user may utilize the identity system to verify the user's identity to perform a secure operation (e.g., establish an account with a financial institution, vote in a governmental election, obtain a governmental service, and/or the like). For example, the identity system may receive, via interaction with the user (e.g., a telephone call), a user request for a secure operation. The identity system may identify secure storage associated with the user based on the phone number or another identifier associated with the user. The identity system may obtain the passphrase from the secure storage and may prompt the user to speak the passphrase. The identity system may receive another voice input of the user speaking the passphrase and may generate a signing key for the user based on the other voice input. The identity system may obtain the one or more encrypted biometric templates from the secure storage and may decrypt the one or more encrypted biometric templates using the signing key. The identity system may generate a request associated with the secure operation based on successful decryption of the one or more encrypted biometric templates. The identity system may sign the request using the signing key to generate a signed request and may transmit the signed request to a device associated with performing the secure operation. In this way, the identity system may prevent a person's level of education or economic level from prohibiting the person from obtaining authentication information that can be used to verify the person's identity.

FIGS. 1A-1F are diagrams of an example 100 associated with utilizing voice biometrics to generate a secure digital identity for a user. As shown in FIGS. 1A-1F, example 100 includes a client device associated with an identity system. The client device may be associated with a user and may include a device configured to provide a biometric input (e.g., a passphrase spoken by the user) to the identity system. For example, the client device may include a telephone, a cellular phone, a smart phone, and/or the like.

The identity system may include one or more devices configured to generate a secure digital identity for a user, as described herein. The identity system may include a trusted execution environment (also referred to as a secure enclave). The trusted execution environment may comprise one or more hardware modules that allow for data processing within hardware-provided, encrypted private memory areas directly on a microprocessor chip of the identity system. The trusted execution environment may run in parallel with an operating system of the identity system and may utilize hardware and software to protect data and code associated with the trusted execution environment. The trusted execution environment may allow the identity system to operate within a secure, isolated environment when deployed within a cloud computing system.

As shown in FIG. 1A, and by reference number 105, the identity system receives, from the client device, a telephone call from a user requesting enrollment in generating a digital identifier for the user. For example, a user may utilize a telephone function of the client device to call the identity system (e.g., by inputting a phone number associated with the identity system via a physical and/or digital keypad of the client device).

As shown by reference number 110, the identity system generates information that identifies a passphrase to be used as a biometric input. In some implementations, the identity system generates the information identifying the passphrase based on receiving the telephone call from the user.

As an example, the identity system may be associated with a plurality of telephone numbers. Each telephone number may be associated with a respective function performed by the identity system. The user may utilize a first telephone number, of the plurality of telephone numbers, to call the identity system. The first telephone number may be associated with the identity system generating the information that identifies the passphrase. The identity system may receive the telephone call and may determine that the first telephone number was utilized to call the identity system. The identity system may generate the information that identifies the passphrase based on the first telephone number being utilized to call the identity system.

Alternatively, and/or additionally, the identity system may generate the information identifying the passphrase based on an input provided by the user. As an example, the identity system may provide a query to the user, via the client device, based on receiving the telephone call. The query may indicate that the user is to provide information identifying a purpose of the telephone call (e.g., provide information identifying a function to be performed by the identity system). The user may provide an input (e.g., a spoken input, a text input, an input corresponding to the user pressing a particular key on the keypad of the client device, and/or the like) to the identity system based on the query. The identity system may generate the information that identifies the passphrase based on the input.

As shown by reference number 115, the identity system provides the information that identifies the passphrase to the client device. In some implementations, the identity system provides the information that identifies the passphrase as an audio output reciting the passphrase to the user. For example, the identity system may include a text-to-speech converter that converts the information that identifies the passphrase to an audio output, and the identity system may provide the audio output to the user via the telephone call.

Alternatively, and/or additionally, the identity system may provide the information that identifies the passphrase as a text output. For example, the identity system may generate a text message that includes the information that identifies the passphrase and may transmit the text message to the client device. The client device may receive the text message and may provide the text message for display to the user.

In some implementations, the identity system determines a form (e.g., audio, text, and/or video) of the information that identifies the passphrase based on information input by the user. For example, the user may input information identifying the form of the information that identifies the passphrase in response to a query provided by the identity system.

As shown by reference number 120, the identity system receives, from the client device, a voice input of the user speaking the passphrase. The user may receive the information that identifies the passphrase via the client device. The user may speak the passphrase based on receiving the information. The client device may utilize a microphone to generate a voice input signal from the voice input based on the user speaking the passphrase and may provide the voice input signal to the identity system via a communication session associated with the telephone call.

In some implementations, the identity system performs a quality assessment on the voice input signal. For example, the identity system may determine a signal-to-noise ratio (SINR) associated with the voice input signal, a quantity of data lost or corrupted during the transmission of the voice input signal, an amount of background noise present in the voice input signal, and/or the like. In some implementations, the identity system may determine that a quality of the voice input signal is insufficient for generating cryptographic keys based on performing the quality assessment. For example, the identity system may determine that the SINR associated with the voice input signal satisfies a first threshold, that the quantity of data lost or corrupted during the transmission of the voice input signal satisfies a second threshold, that the amount of background noise present in the voice input signal satisfies a third threshold, and/or the like. The identity system may request that the user repeat the passphrase and/or may receive another voice input based on determining that the quality of the voice input signal is insufficient for generating the cryptographic keys.

In some implementations, the identity system determines that the quality of the voice input signal is sufficient for generating cryptographic keys. For example, the identity system may determine that the SINR associated with the voice input signal satisfies a fourth threshold, that the quantity of data lost or corrupted during the transmission of the voice input signal satisfies a fifth threshold, that the amount of background noise present in the voice input signal satisfies a sixth threshold, and/or the like. The identity system may provide the voice input signal to the trusted execution environment of the identity system based on the quality of the voice input signal being sufficient for generating the cryptographic keys.

Figure 1B:
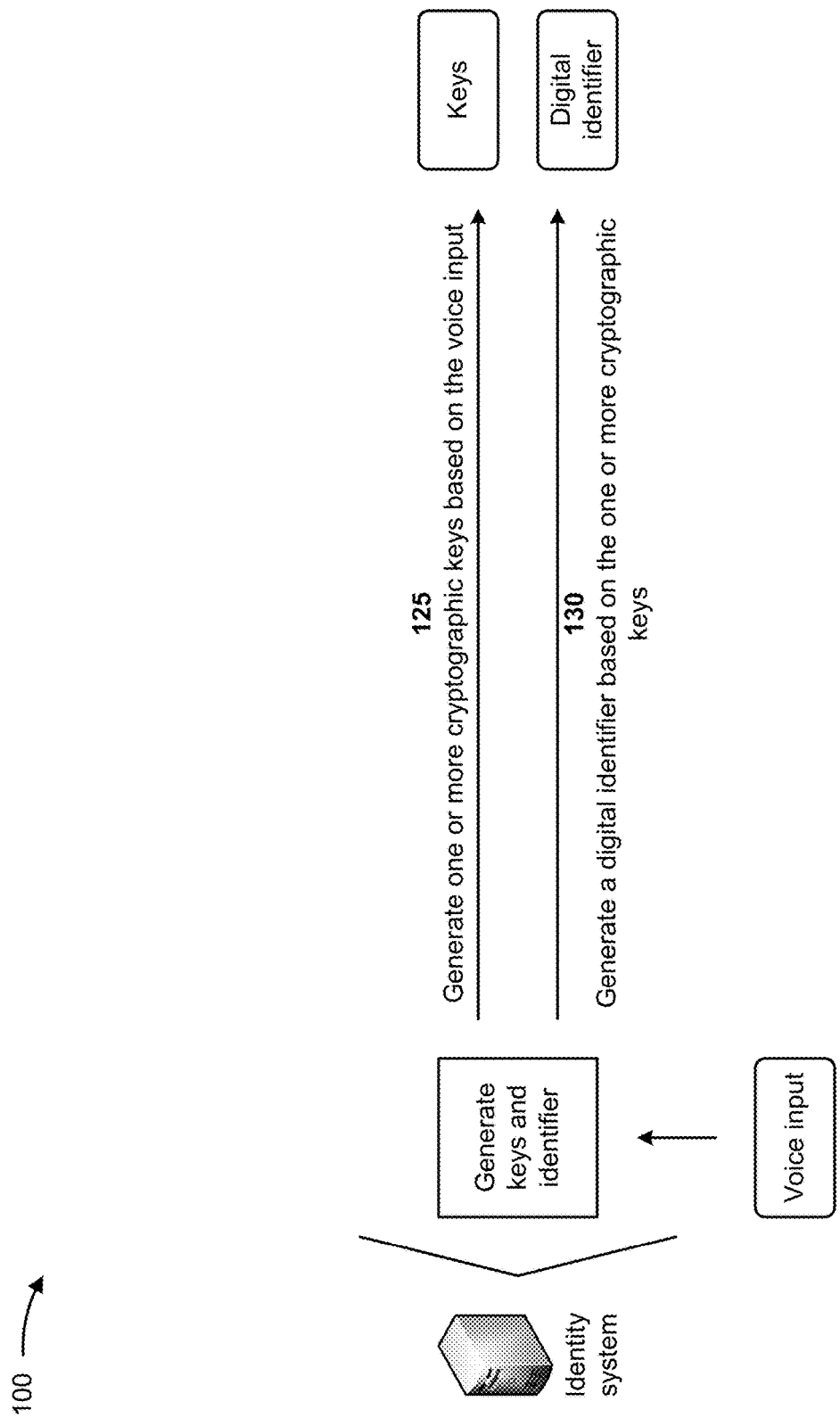

As shown in FIG. 1B, and by reference number 125, the identity system generates one or more cryptographic keys based on the voice input signal. For example, the identity system may generate a public key and a corresponding private key based on the voice input signal. The identity system may generate the one or more cryptographic keys within the trusted execution environment of the identity system.

In some implementations, the identity system utilizes a Fuzzy extractor to generate the one or more cryptographic keys. The Fuzzy extractor may be a biometric tool that allows for user authentication using a biometric template constructed from the user's biometric data (e.g., the voice input signal) as a key. The identity system may utilize the Fuzzy extractor to extract a uniform and random string R from the voice input signal. The string R may have a tolerance for noise such that the string R may be extracted from another voice input signal having small changes relative to the voice input signal (e.g., small changes caused by a SINR associated with the other voice input signal, small changes caused by the user speaking the passphrase in a slightly different manner, and/or the like). The identity system may generate a cryptographic key based on the string R.

In some implementations, the identity system utilizes the Fuzzy extractor to generate a helper string P. The helper string P comprise a function (e.g., a probabilistic function) that enables the identity system to generate the original voice input provided by the user from a subsequent voice input provided by the user that is sufficiently similar to the original voice input. The subsequent voice input may be sufficiently similar to the original voice when a Hamming distance (e.g., a quantity of bit positions that differ between the original voice input signal and the subsequent voice input signal) satisfies a Hamming distance threshold, when an edit distance (e.g., a quantity of insertions and deletions needed to convert the subsequent voice input signal into the original voice input signal) satisfies an edit distance threshold, and/or the like.

As shown by reference number 130, the identity system generates a digital identifier based on the one or more cryptographic keys. The identity system may generate the digital identifier within the trusted execution environment of the identity system. The digital identifier may be a persistent identifier or handle used to identify a secure storage associated with the user. The secure storage may include a wallet stored in a memory within the trusted execution environment and/or a wallet stored in a memory of the client device.

In some implementations, the identity system generates the digital identifier based on one or more portions of the one or more cryptographic keys. For example, the identity system may generate the digital identifier based on utilizing the one or more cryptographic keys as parameters of, or inputs to, an algorithm (e.g., a cryptographic algorithm, a hashing algorithm, and/or another type of algorithm).

Figure 1C:
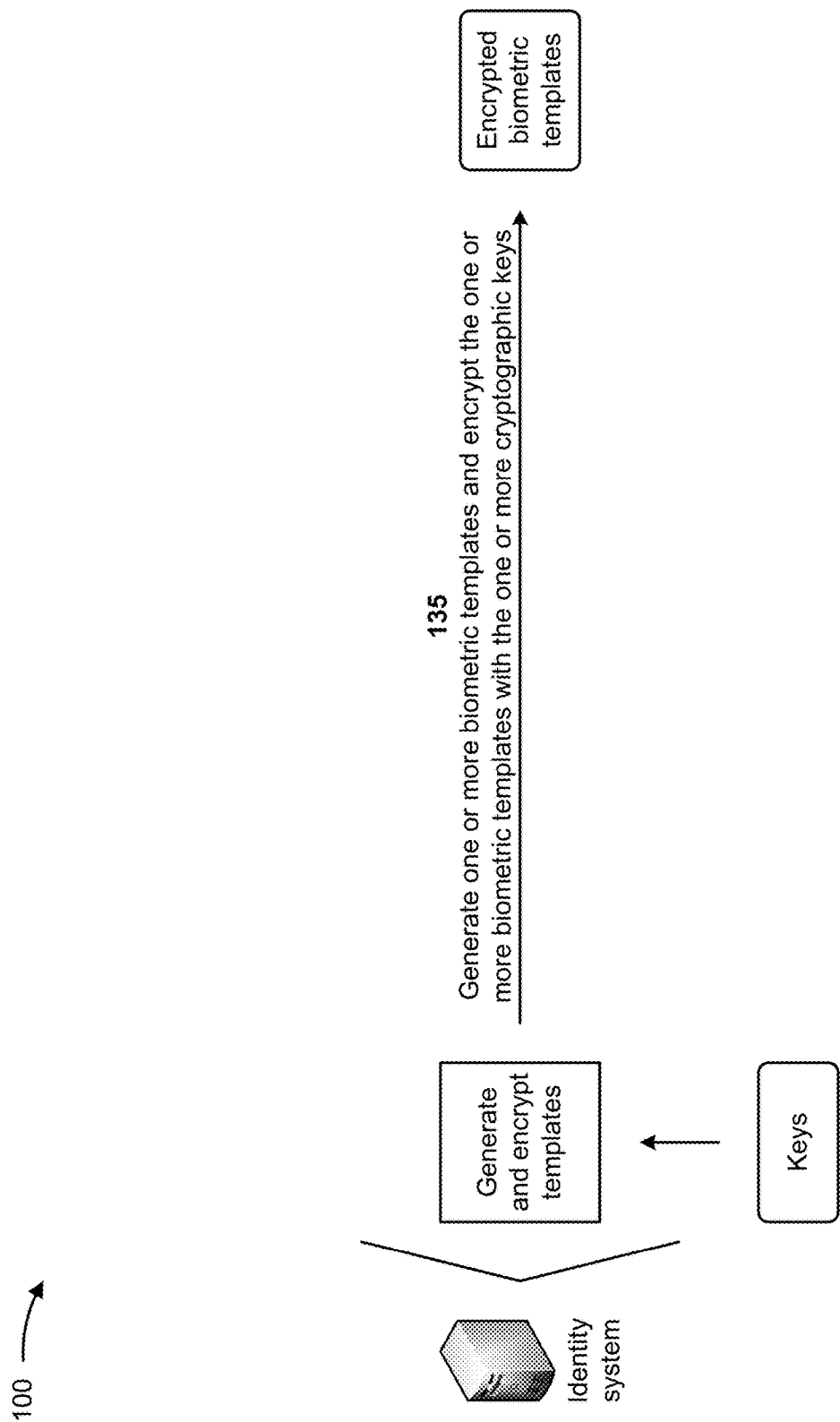

As shown in FIG. 1C, and by reference number 135, the identity system generates one or more biometric templates and encrypts the one or more biometric templates with the one or more cryptographic keys. A biometric template, of the one or more biometric templates, may comprise a digital representation of one or more unique features of the voice input signal. The identity system may analyze the voice input signal to determine the one or more unique features of the voice input. The identity system may extract one or more portions of the voice input signal corresponding to the one or more unique features. The identity system may convert the one or more portions of the voice input signal into a mathematical file corresponding to the biometric template.

The identity system may encrypt the biometric template with the one or more cryptographic keys. In some implementations, the identity system encrypts the biometric template based on a feature transformation approach. The identity system may derive one or more parameters of a transformation function (e.g., a bio-hashing transformation function, a salting transformation function, a non-invertible transformation function, and/or the like) from the one or more cryptographic keys. The identity system may use the transformation function to transform the biometric template. Alternatively, and/or additionally, the identity system may encrypt the biometric template based on a biometric cryptosystem, a key-binding biometric cryptosystem, a key generating biometric cryptosystem, and/or the like.

Figure 1D:
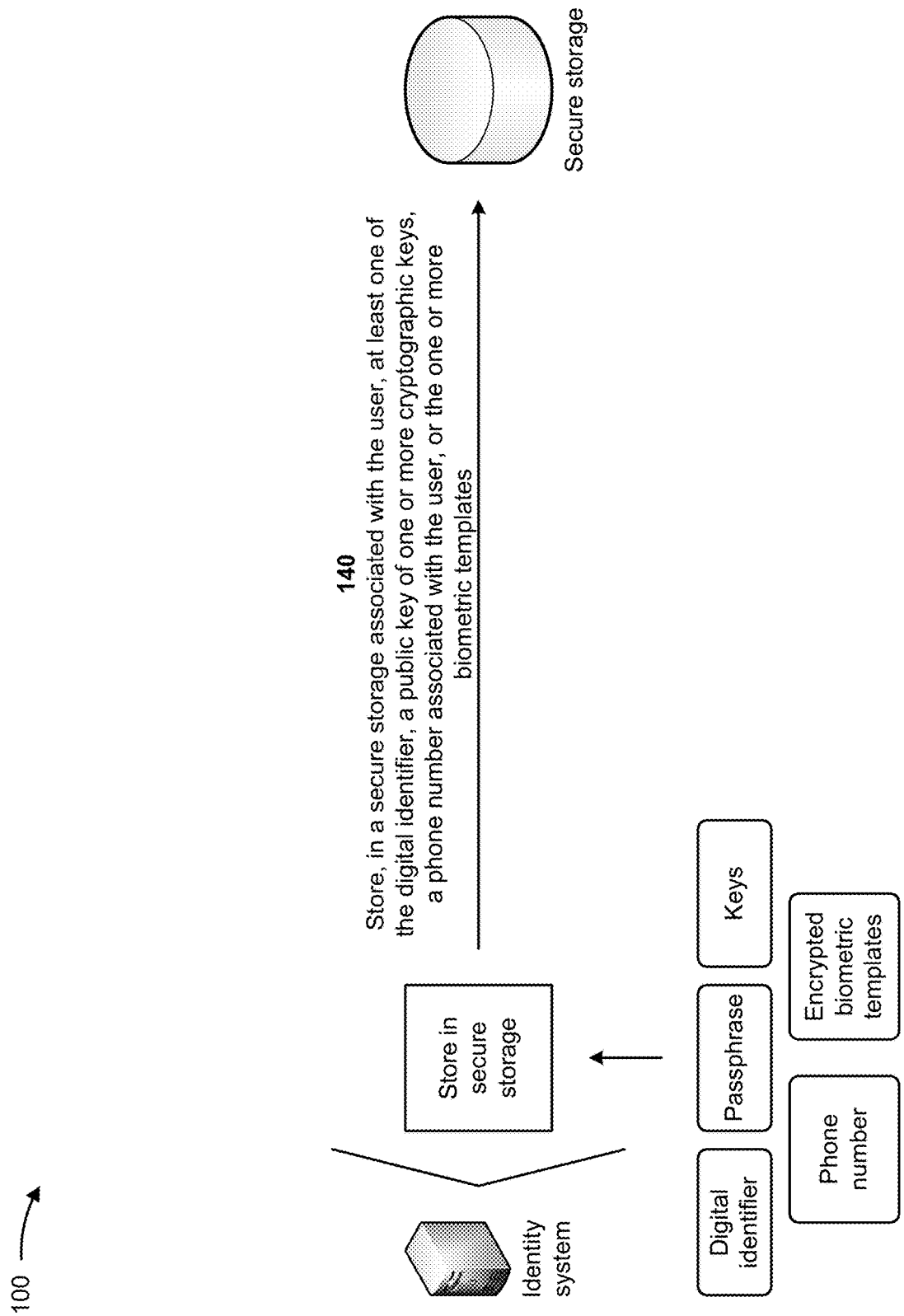

As shown in FIG. 1D, and by reference number 140, the identity system stores, in a secure storage associated with the user, at least one of the digital identifier, a public key of the one or more cryptographic keys, a phone number associated with the user, or the one or more biometric templates. In some implementations, the secure storage is a wallet stored in a memory within the trusted execution environment. In some implementations, the secure storage is a wallet stored in a memory of the client device. In some implementations, the secure storage is a secure memory of another device (e.g., a server device associated with a governmental entity).

Figure 1E:
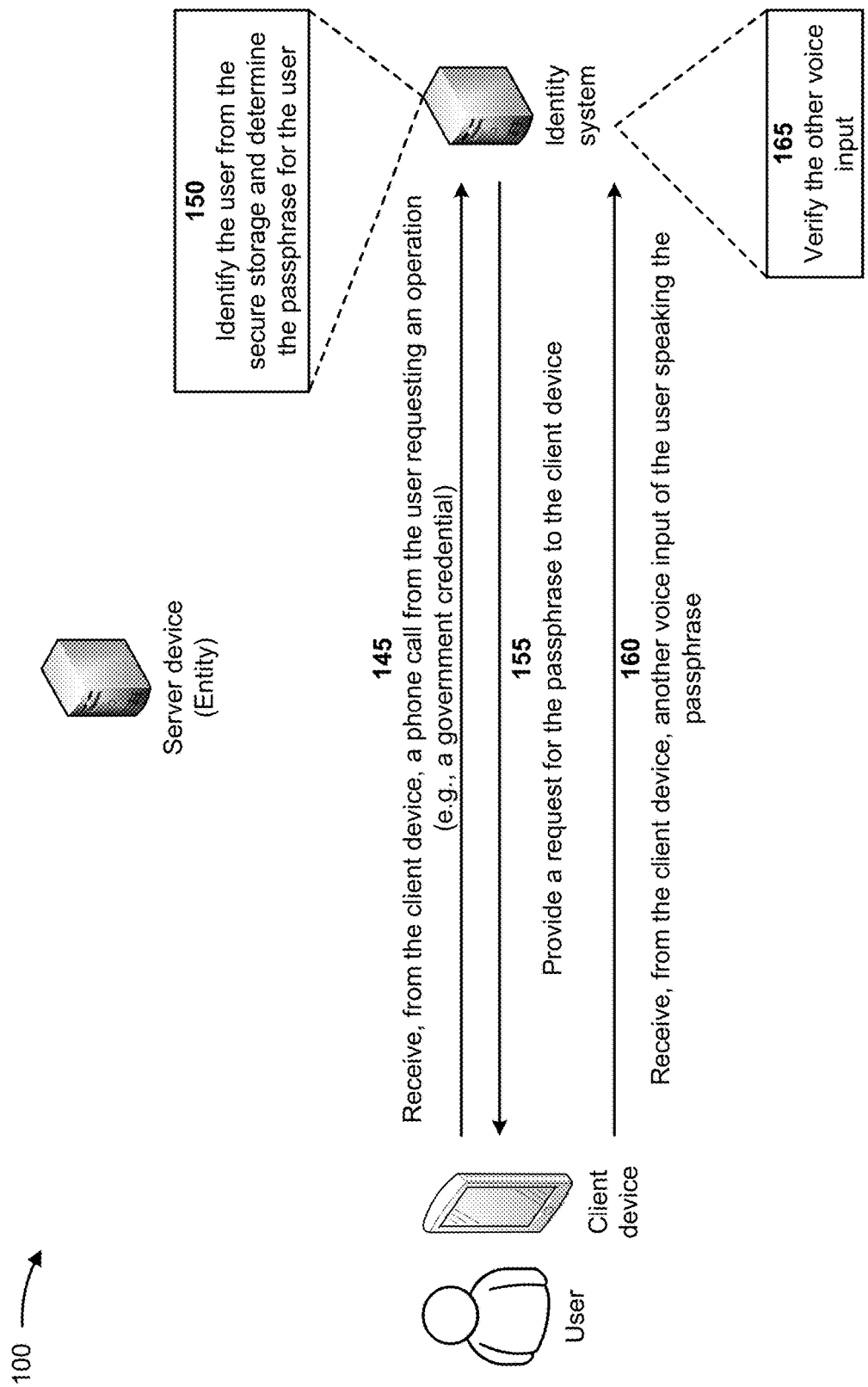

As shown in FIG. 1E, and by reference number 145, the identity system receives, from the client device, a telephone call from the user requesting an operation (e.g., issuance of a government credential). For example, the user may utilize the client device to call the identity system to acquire a digital verification of the user's identity (e.g., a government credential) for obtaining a driver's license, registering to vote, enrolling in a government program, and/or the like.

As shown by reference number 150, the identity system identifies the user from the secure storage and determines the passphrase for the user. The identity system may identify the secure storage associated with the user based on the phone number or another identifier associated with the user and/or the client device utilized by the user to call the identity system. The secure storage may include information identifying the user and/or information identifying the passphrase.

As shown by reference number 155, the identity system provides a request for the passphrase to the client device. The identity system may obtain the passphrase from the secure storage. The identity system may prompt the user to speak the passphrase based on obtaining the passphrase from the secure storage. For example, the identity system may provide a voice output to the client device. The voice output may instruct the user to speak the passphrase.

As shown by reference number 160, the identity system receives, from the client device, another voice input of the user speaking the passphrase. The other voice input may correspond to the user speaking the passphrase based on being prompted to speak the passphrase by the identity system to generate another voice input signal. In some implementations, the identity system performs a quality assessment on the other voice input signal in a manner similar to that described above.

As shown by reference number 165, the identity system verifies the other voice input. The identity system may generate a signing key associated with the user based on the other voice input signal and/or based on performing the quality assessment. The identity system may utilize a Fuzzy extractor to generate another string R based on the other voice input signal, in a manner similar to that described above. The identity system may obtain the one or more encrypted biometric templates from the secure storage and may utilize the signing key to decrypt the one or more encrypted biometric templates.

The identity system may verify the other voice input based on the one or more biometric templates. For example, the identity system may compare the other voice input signal and the one or more biometric templates. The identity system may verify the other voice input based on the comparison.

Figure 1F:
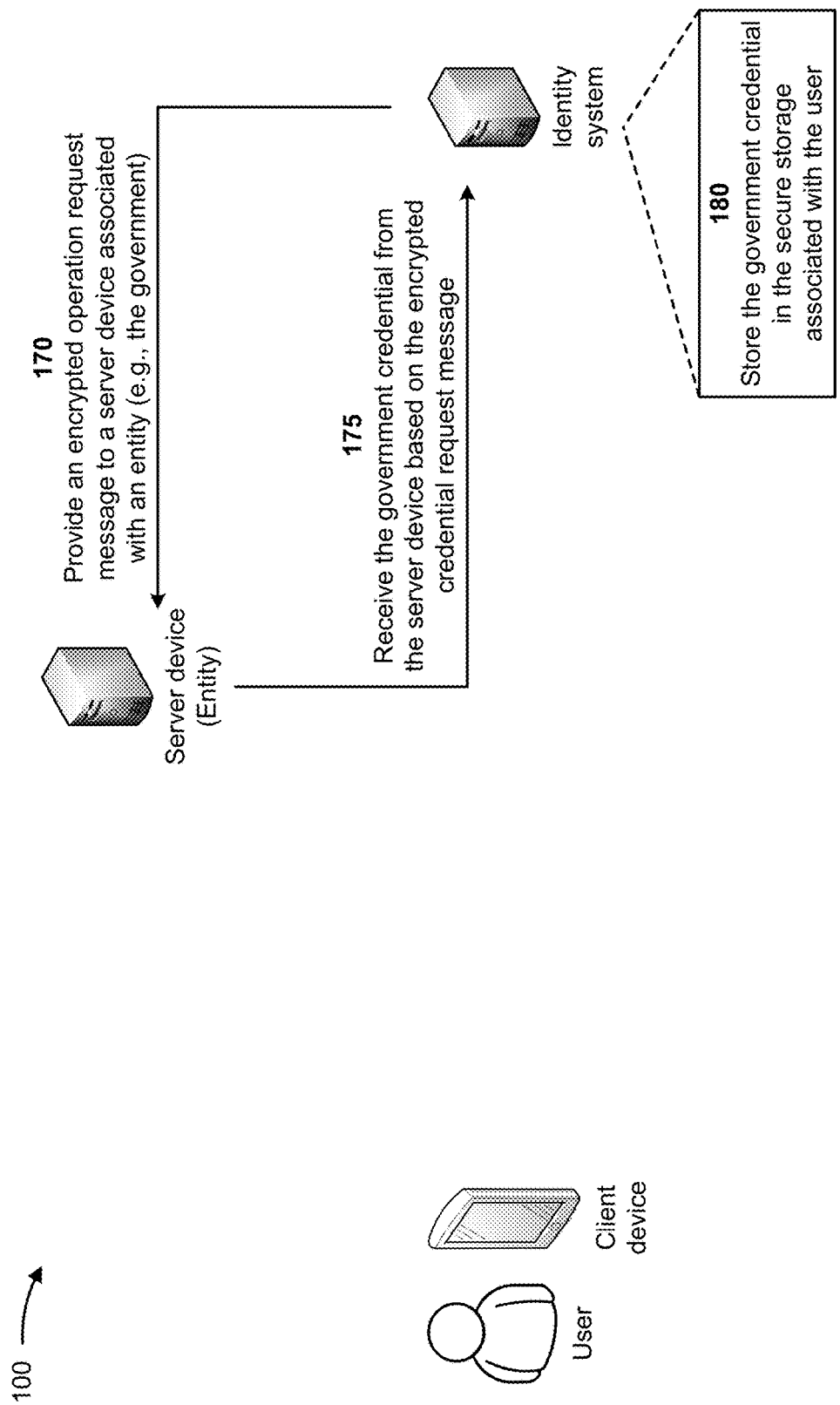

As shown in FIG. 1F, and by reference number 170, the identity system provides an encrypted operation request message to a server device associated with an entity (e.g., a governmental entity). The identity system may generate an operation request message based on verifying the other voice input. The operation request message may include a request for a credential associated with the user. The credential may be a trusted identification credential issued by a trusted entity (e.g., a government credential issued by a government agency). The identity system may utilize the signing key to sign the operation request message and to generate the encrypted operation request message. The identity system may transmit the encrypted operation request message to the server device associated with the entity.

As shown by reference number 175, the identity system receives the credential from the server device based on the encrypted credential request message. The identity system may identify the secure storage associated with the user based on receiving the credential. In some implementations, the identity system identifies the secure storage based on the digital identifier. In some implementations, the identity system receives the digital identifier from the server device based on transmitting the encrypted operation request message. In some implementations, the identity system generates the digital identifier based on the other voice input signal in a manner similar to that described above. In some implementations, the identity system receives the digital identifier from the client device. For example, the digital identifier may be stored in a memory of the client device and the client device may provide the digital identifier to the identity system based on providing the other voice input to the identity system. As shown by reference number 180, the identity system stores the credential in the secure storage associated with the user.

The identity system may determine an entity requiring the user's identity to be verified. In some implementations, the identity system requests information identifying the entity from the user (e.g., via an audio message, a text message, and/or the like transmitted to the client device). The user may provide an input (e.g., a voice input, a text input, and/or the like) identifying the entity. The identity system may identify the entity based on the input. The identity system may determine a device (e.g., a server device, a client device, and/or another type of device) associated with the entity (e.g., by accessing a data structure (e.g., a database, a list, a table, and/or the like) storing information mapping entities to addresses of devices associated with the entities). In some implementations, the identity system provides the credential to the device associated with the entity to enable the device to verify the identity of the user. Alternatively, and/or additionally, the identity system may provide the digital identifier to the device associated with the entity to enable the entity to retrieve the credential from the secure storage. In some implementations, the identity system provides the credential and/or the digital identifier based on the entity performing a physical identity verification on the user. The entity may obtain the credential from the identity system and may verify the identity of the user based on the credential.

In some implementations, the operation may be a secure transaction (e.g., a financial transaction). The identity system may transmit the credential to a device associated with performing the secure transaction. The identity system may receive transaction information associated with the secured transaction being performed by the device based on transmitting the credential to the device. The identity system may store the transaction information in the secured storage associated with the user.

As indicated above, FIGS. 1A-1F are provided as an example. Other examples may differ from what is described with regard to FIGS. 1A-1F. The number and arrangement of devices shown in FIGS. 1A-1F are provided as an example. In practice, there may be additional devices, fewer devices, different devices, or differently arranged devices than those shown in FIGS. 1A-1F. Furthermore, two or more devices shown in FIGS. 1A-1F may be implemented within a single device, or a single device shown in FIGS. 1A-1F may be implemented as multiple, distributed devices. Additionally, or alternatively, a set of devices (e.g., one or more devices) shown in FIGS. 1A-1F may perform one or more functions described as being performed by another set of devices shown in FIGS. 1A-1F.

Figure 2:
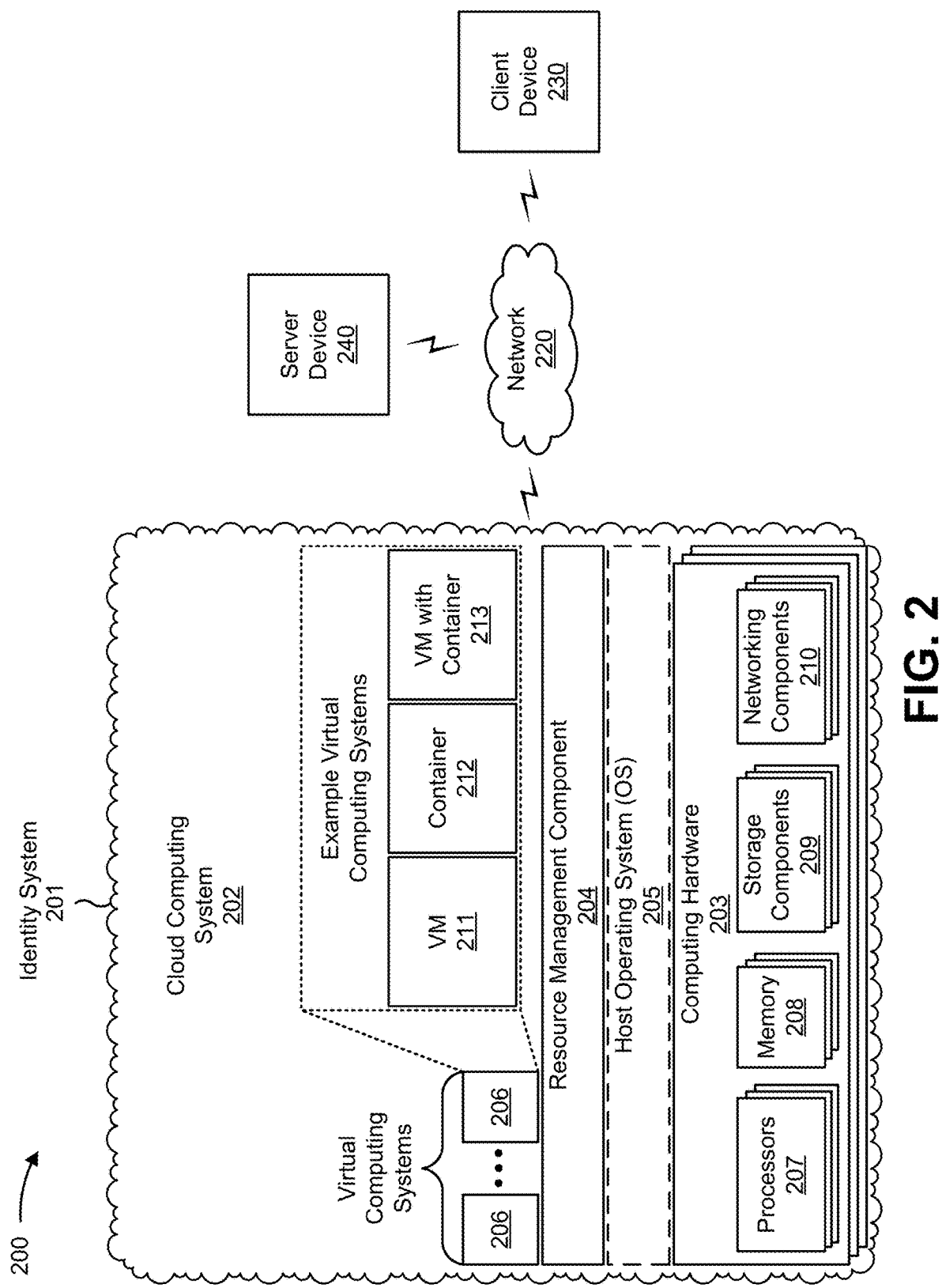
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include an identity system 201, which may include one or more elements of and/or may execute within a cloud computing system 202. The cloud computing system 202 may include one or more elements 203-213, as described in more detail below. As further shown in FIG. 2, environment 200 may include a network 220, a client device 230, and/or a server device 240. Devices and/or elements of environment 200 may interconnect via wired connections and/or wireless connections.

The cloud computing system 202 includes computing hardware 203, a resource management component 204, a host operating system (OS) 205, and/or one or more virtual computing systems 206. The resource management component 204 may perform virtualization (e.g., abstraction) of computing hardware 203 to create the one or more virtual computing systems 206. Using virtualization, the resource management component 204 enables a single computing device (e.g., a computer, a server, and/or the like) to operate like multiple computing devices, such as by creating multiple isolated virtual computing systems 206 from computing hardware 203 of the single computing device. In this way, computing hardware 203 can operate more efficiently, with lower power consumption, higher reliability, higher availability, higher utilization, greater flexibility, and lower cost than using separate computing devices.

Computing hardware 203 includes hardware and corresponding resources from one or more computing devices. For example, computing hardware 203 may include hardware from a single computing device (e.g., a single server) or from multiple computing devices (e.g., multiple servers), such as multiple computing devices in one or more data centers. As shown, computing hardware 203 may include one or more processors 207, one or more memories 208, one or more storage components 209, and/or one or more networking components 210. Examples of a processor, a memory, a storage component, and a networking component (e.g., a communication component) are described elsewhere herein.

The resource management component 204 includes a virtualization application (e.g., executing on hardware, such as computing hardware 203) capable of virtualizing computing hardware 203 to start, stop, and/or manage one or more virtual computing systems 206. For example, the resource management component 204 may include a hypervisor (e.g., a bare-metal or Type 1 hypervisor, a hosted or Type 2 hypervisor, and/or the like) or a virtual machine monitor, such as when the virtual computing systems 206 are virtual machines 211. Additionally, or alternatively, the resource management component 204 may include a container manager, such as when the virtual computing systems 206 are containers 212. In some implementations, the resource management component 204 executes within and/or in coordination with a host operating system 205.

A virtual computing system 206 includes a virtual environment that enables cloud-based execution of operations and/or processes described herein using computing hardware 203. As shown, a virtual computing system 206 may include a virtual machine 211, a container 212, a hybrid environment 213 that includes a virtual machine and a container, and/or the like. A virtual computing system 206 may execute one or more applications using a file system that includes binary files, software libraries, and/or other resources required to execute applications on a guest operating system (e.g., within the virtual computing system 206) or the host operating system 205.

Although the identity system 201 may include one or more elements 203-213 of the cloud computing system 202, may execute within the cloud computing system 202, and/or may be hosted within the cloud computing system 202, in some implementations, the identity system 201 may not be cloud-based (e.g., may be implemented outside of a cloud computing system) or may be partially cloud-based. For example, the identity system 201 may include one or more devices that are not part of the cloud computing system 202, such as device 300 of FIG. 3, which may include a standalone server or another type of computing device. The identity system 201 may perform one or more operations and/or processes described in more detail elsewhere herein.

Network 220 includes one or more wired and/or wireless networks. For example, network 220 may include a cellular network, a public land mobile network (PLMN), a local area network (LAN), a wide area network (WAN), a private network, the Internet, and/or the like, and/or a combination of these or other types of networks. The network 220 enables communication among the devices of environment 200.

The client device 230 includes one or more devices capable of receiving, generating, storing, processing, and/or providing information associated with utilizing voice biometrics to generate a secure digital identity for a user, as described elsewhere herein. The client device 230 may include a communication device and/or a computing device. For example, the client device 230 may include a wireless communication device, a user equipment (UE), a mobile phone (e.g., a smart phone or a cell phone, among other examples), a laptop computer, a tablet computer, a handheld computer, a desktop computer, a gaming device, a wearable communication device (e.g., a smart wristwatch or a pair of smart eyeglasses, among other examples), an Internet of Things (IoT) device, or a similar type of device. The client device 230 may communicate with one or more other devices of environment 200, as described elsewhere herein.

The server device 240 includes one or more devices capable of receiving, generating, storing, processing, providing, and/or routing information associated with utilizing voice biometrics to generate a secure digital identity for a user, as described elsewhere herein. The server device 240 may include a communication device and/or a computing device. For example, the server device 240 may include a server, an application server, a client server, a web server, a database server, a host server, a proxy server, a virtual server (e.g., executing on computing hardware), a server in a cloud computing system, a device that includes computing hardware used in a cloud computing environment, or a similar type of device. The server device 240 may communicate with one or more other devices of environment 200, as described elsewhere herein.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
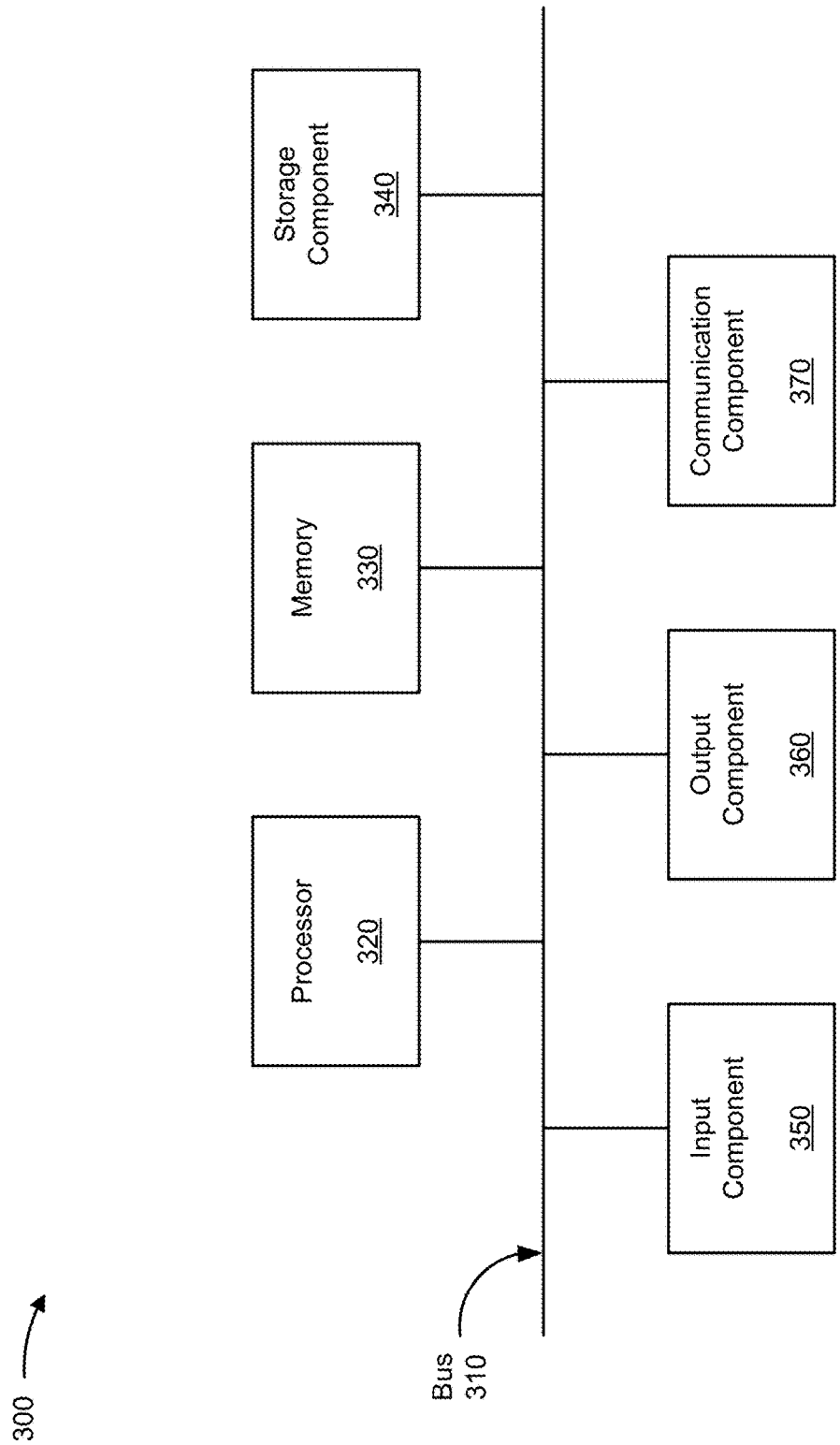
FIG. 3 is a diagram of example components of one or more devices of FIG. 2.

FIG. 3 is a diagram of example components of a device 300, which may correspond to identity system 201, client device 230, and/or server device 240. In some implementations, identity system 201, client device 230, and/or server device 240 may include one or more devices 300 and/or one or more components of device 300. As shown in FIG. 3, device 300 may include a bus 310, a processor 320, a memory 330, a storage component 340, an input component 350, an output component 360, and a communication component 370.

Bus 310 includes a component that enables wired and/or wireless communication among the components of device 300. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform a function. Memory 330 includes a random access memory, a read only memory, and/or another type of memory (e.g., a flash memory, a magnetic memory, and/or an optical memory).

Storage component 340 stores information and/or software related to the operation of device 300. For example, storage component 340 may include a hard disk drive, a magnetic disk drive, an optical disk drive, a solid state disk drive, a compact disc, a digital versatile disc, and/or another type of non-transitory computer-readable medium. Input component 350 enables device 300 to receive input, such as user input and/or sensed inputs. For example, input component 350 may include a touch screen, a keyboard, a keypad, a mouse, a button, a microphone, a switch, a sensor, a global positioning system component, an accelerometer, a gyroscope, an actuator, and/or the like. Output component 360 enables device 300 to provide output, such as via a display, a speaker, and/or one or more light-emitting diodes. Communication component 370 enables device 300 to communicate with other devices, such as via a wired connection and/or a wireless connection. For example, communication component 370 may include a receiver, a transmitter, a transceiver, a modem, a network interface card, an antenna, and/or the like.

Device 300 may perform one or more processes described herein. For example, a non-transitory computer-readable medium (e.g., memory 330 and/or storage component 340) may store a set of instructions (e.g., one or more instructions, code, software code, program code, and/or the like) for execution by processor 320. Processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flowchart of an example process 400 associated with utilizing voice biometrics to generate a secure digital identity for a user. In some implementations, one or more process blocks of FIG. 4 may be performed by a system (e.g., identity system 201). In some implementations, one or more process blocks of FIG. 4 may be performed by another device or a group of devices separate from or including the system, such as a client device (e.g., client device 230) and/or a server device (e.g., server device 240). Additionally, or alternatively, one or more process blocks of FIG. 4 may be performed by one or more components of device 300, such as processor 320, memory 330, storage component 340, input component 350, output component 360, and/or communication component 370.

As shown in FIG. 4, process 400 may include generating information that identifies a passphrase to be used as a biometric input (block 410). For example, the system may generate information that identifies a passphrase to be used as a biometric input, as described above.

In some implementations, the system may receive, via interaction with a user, a request for a digital identifier. The system may generate the information that identifies the passphrase based on the request for the digital identifier. The system may provide, via interaction with the user, information instructing the user to speak the passphrase.

As further shown in FIG. 4, process 400 may include receiving a voice input of a user speaking the passphrase (block 420). For example, the system may receive a voice input of a user speaking the passphrase, as described above.

As further shown in FIG. 4, process 400 may include generating one or more cryptographic keys based on the voice input (block 430). For example, the system may generate one or more cryptographic keys based on the voice input, as described above. The one or more cryptographic keys may include a public key and a corresponding private key.

As further shown in FIG. 4, process 400 may include generating a digital identifier based on the one or more cryptographic keys (block 440). For example, the system may generate a digital identifier based on the one or more cryptographic keys, as described above.

As further shown in FIG. 4, process 400 may include generating one or more biometric templates for the user (block 450). For example, the system may generate one or more biometric templates for the user, as described above.

As further shown in FIG. 4, process 400 may include encrypting the one or more biometric templates using the one or more cryptographic keys and to generate one or more encrypted biometric templates (block 460). For example, the system may encrypt the one or more biometric templates using the one or more cryptographic keys and to generate one or more encrypted biometric templates, as described above.

As further shown in FIG. 4, process 400 may include storing in a secure storage associated with the user, at least one of the digital identifier, a public key of the one or more cryptographic keys, a phone number associated with the user, or the one or more encrypted biometric templates (block 470). For example, the system may store in a secure storage associated with the user, at least one of the digital identifier, a public key of the one or more cryptographic keys, a phone number associated with the user, or the one or more encrypted biometric templates, as described above.

In some implementations, the system may receive, via interaction with the user, a user request for a trusted identification credential for the user. The system may identify the secure storage associated with the user based on the phone number or another identifier associated with the user. The system may obtain the passphrase from the secure storage and may prompt the user to speak the passphrase. The system may receive another voice input of the user speaking the passphrase and may generate a signing key for the user based on the other voice input. The signing key may be generated using a fuzzy extractor technique.

The system may obtain the one or more encrypted biometric templates from the secure storage and may decrypt the one or more encrypted biometric templates using the signing key. The system may generate a request for the trusted identification credential based on successful decryption of the one or more encrypted biometric templates. The system may sign the request using the signing key to generate a signed request and may transmit the signed request to a device associated with a trusted agency. The system may receive the trusted identification credential and the digital identifier (e.g., based on transmitting the signed request to the device associated with the trusted agency). The system may identify the secure storage based on the digital identifier and may store the trusted identification credential in the secure storage.

In some implementations, the system may receive, via interaction with the user, a user request for a secure operation. The system may identify the secure storage associated with the user based on the phone number or another identifier associated with the user. The system may obtain the passphrase from the secure storage and may prompt the user to speak the passphrase. The system may receive another voice input of the user speaking the passphrase and may generate a signing key for the user based on the other voice input. The system may obtain the one or more encrypted biometric templates from the secure storage and may decrypt the one or more encrypted biometric templates using the signing key. The system may generate a request associated with the secure operation based on successful decryption of the one or more encrypted biometric templates. The system may sign the request using the signing key to generate a signed request and may transmit the signed request to a device associated with performing the secure operation.

The system may receive, from the device, the digital identifier and information generated based on performing the secure operation. The system may identify the secure storage based on the digital identifier. The system may store the information generated based on performing the secure operation in the secure storage.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise form disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, etc., depending on the context.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   generating, by a system, information that identifies a passphrase to be used as a biometric input;
   receiving, by the system, a voice input of a user speaking the passphrase;
   generating, by the system, one or more cryptographic keys based on the voice input;
   generating, by the system, a digital identifier based on the one or more cryptographic keys;
   generating, by the system, one or more biometric templates for the user based on the voice input,
      wherein a biometric template, of the one or more biometric templates, comprises a digital representation of one or more unique features of the voice input;
   encrypting, by the system, the one or more biometric templates, using the one or more cryptographic keys to generate one or more encrypted biometric templates; and
   storing, by the system, in a secure storage associated with the user, at least one of the digital identifier, a public key of the one or more cryptographic keys, a phone number associated with the user, or the one or more encrypted biometric templates.

2. The method of claim 1, further comprising:
   receiving, via an interaction with the user, a user request for a trusted identification credential for the user;
   identifying the secure storage associated with the user based on the phone number or another identifier associated with the user;
   obtaining the passphrase from the secure storage;
   prompting the user to speak the passphrase;
   receiving another voice input of the user speaking the passphrase;
   generating a signing key for the user based on the other voice input;

obtaining the one or more encrypted biometric templates from the secure storage;
decrypting the one or more encrypted biometric templates using the signing key;
generating a request for the trusted identification credential based on successful decryption of the one or more encrypted biometric templates;
signing the request using the signing key to generate a signed request; and
transmitting the signed request to a device associated with a trusted agency.

3. The method of claim 2, further comprising:
receiving the trusted identification credential and the digital identifier;
identifying the secure storage based on the digital identifier; and
storing the trusted identification credential in the secure storage.

4. The method of claim 2, wherein the signing key is generated using a fuzzy extractor technique.

5. The method of claim 1, further comprising:
receiving, via an interaction with the user, a user request for a secure operation;
identifying the secure storage associated with the user based on the phone number or another identifier associated with the user;
obtaining the passphrase from the secure storage;
prompting the user to speak the passphrase;
receiving another voice input of the user speaking the passphrase;
generating a signing key for the user based on the other voice input;
obtaining the one or more encrypted biometric templates from the secure storage;
decrypting the one or more encrypted biometric templates using the signing key;
generating a request associated with the secure operation based on successful decryption of the one or more encrypted biometric templates;
signing the request using the signing key to generate a signed request; and
transmitting the signed request to a device associated with performing the secure operation.

6. The method of claim 5, further comprising:
receiving, from the device, the digital identifier and information generated based on performing the secure operation;
identifying the secure storage based on the digital identifier; and
storing the information generated based on performing the secure operation in the secure storage.

7. The method of claim 5, wherein the signing key is generated using a fuzzy extractor technique.

8. A system, comprising:
one or more memories; and
one or more processors, coupled to the one or more memories, configured to:
generate information that identifies a passphrase to be used as a biometric input;
receive a voice input of a user speaking the passphrase;
generate one or more cryptographic keys based on the voice input and using a fuzzy extractor technique, wherein the one or more cryptographic keys include a public key and a corresponding private key;
generate a digital identifier based on the one or more cryptographic keys;
generate one or more biometric templates for the user based on the voice input,
wherein a biometric template, of the one or more biometric templates, comprises a digital representation of one or more unique features of the voice input;
encrypt the one or more biometric templates, using the one or more cryptographic keys, to generate one or more encrypted biometric templates; and
store, in a secure storage associated with the user, at least one of the digital identifier, a public key of the one or more cryptographic keys, a phone number associated with the user, or the one or more encrypted biometric templates.

9. The system of claim 8, wherein the one or more processors are further configured to:
receive, via a first interaction with the user, a request for the digital identifier;
generate the information that identifies the passphrase based on the request for the digital identifier; and
provide, via a second interaction with the user, information instructing the user to speak the passphrase.

10. The system of claim 8, wherein the one or more processors are further configured to:
receive, via an interaction with the user, a user request for a credential for the user;
identify the secure storage associated with the user based on the phone number or another identifier associated with the user;
obtain the passphrase from the secure storage;
prompt the user to speak the passphrase;
receive another voice input of the user speaking the passphrase;
generate a signing key for the user based on the other voice input;
obtain the one or more encrypted biometric templates from the secure storage;
decrypt the one or more encrypted biometric templates using the signing key;
generate a request for the credential based on successful decryption of the one or more encrypted biometric templates;
sign the request using the signing key to generate a signed request; and
transmit the signed request to a device associated with an entity providing the credential.

11. The system of claim 10, wherein the one or more processors are further configured to:
receive, from the device, the credential and the digital identifier;
identify the secure storage based on the digital identifier; and
store the credential in the secure storage.

12. The system of claim 10, wherein the signing key is generated using a fuzzy extractor technique.

13. The system of claim 8, wherein the one or more processors are further configured to:
receive, via an interaction with the user, a user request for a secure transaction;
identify the secure storage associated with the user based on the phone number or another identifier associated with the user;
obtain the passphrase from the secure storage;
prompt the user to speak the passphrase;
receive another voice input of the user speaking the passphrase;

generate a signing key for the user based on the other voice input;
obtain the one or more encrypted biometric templates from the secure storage;
decrypt the one or more encrypted biometric templates using the signing key;
generate a request associated with the secure transaction based on successful decryption of the one or more encrypted biometric templates;
sign the request using the signing key to generate a signed request; and
transmit the signed request to a device associated with performing the secure transaction.

14. The system of claim 13, wherein the one or more processors are further configured to:
receive, from the device, the digital identifier and transaction information generated based on performing the secure transaction;
identify the secure storage based on the digital identifier; and
store the transaction information in the secure storage.

15. A non-transitory computer-readable medium storing a set of instructions, the set of instructions comprising:
one or more instructions that, when executed by one or more processors of a system, cause the system to:
receive, via a first interaction with a user, a request for a digital identifier for the user;
generate, based on the request, information that identifies a passphrase to be used as a biometric input;
provide, via a second interaction with the user, information instructing the user to speak the passphrase;
receive a voice input of the user speaking the passphrase;
generate one or more cryptographic keys based on the voice input;
generate a digital identifier based on the one or more cryptographic keys;
generate one or more biometric templates for the user based on the voice input,
wherein a biometric template, of the one or more biometric templates, comprises a digital representation of one or more unique features of the voice input;
encrypt the one or more biometric templates, using the one or more cryptographic keys, to generate one or more encrypted biometric templates; and
store, in a secure storage associated with the user, at least one of the digital identifier, a public key of the one or more cryptographic keys, a phone number associated with the user, or the one or more encrypted biometric templates.

16. The non-transitory computer-readable medium of claim 15, wherein the one or more cryptographic keys are generated using a fuzzy extractor technique.

17. The non-transitory computer-readable medium of claim 15, wherein the one or more cryptographic keys include the public key and a corresponding private key.

18. The non-transitory computer-readable medium of claim 15, wherein the one or more instructions further cause the system to:
receive, via a third interaction with the user, a user request for an identification credential for the user;
identify the secure storage associated with the user based on the phone number or another identifier associated with the user;
obtain the passphrase from the secure storage;
prompt the user to speak the passphrase;
receive another voice input of the user speaking the passphrase;
generate a signing key for the user based on the other voice input;
obtain the one or more encrypted biometric templates from the secure storage;
decrypt the one or more encrypted biometric templates using the signing key;
generate a request for the identification credential based on successful decryption of the one or more encrypted biometric templates;
sign the request using the signing key to generate a signed request;
transmit the signed request to a device associated with the identification credential;
receive, from the device, the identification credential and the digital identifier;
identify the secure storage based on the digital identifier; and
store the identification credential in the secure storage.

19. The non-transitory computer-readable medium of claim 15, wherein the one or more instructions further cause the system to:
receive, via a third interaction with the user, a user request for a secure transaction;
identify the secure storage associated with the user based on the phone number or another identifier associated with the user;
obtain the passphrase from the secure storage;
prompt the user to speak the passphrase;
receive another voice input of the user speaking the passphrase;
generate a signing key for the user based on the other voice input;
obtain the one or more encrypted biometric templates from the secure storage;
decrypt the one or more encrypted biometric templates using the signing key;
generate a request associated with the secure transaction based on successful decryption of the one or more encrypted biometric templates;
sign the request using the signing key to generate a signed request;
transmit the signed request to a device associated with performing the secure transaction;
receive, from the device, the digital identifier and transaction information generated based on performing the secure transaction;
identify the secure storage based on the digital identifier; and
store the transaction information in the secure storage.

20. The non-transitory computer-readable medium of claim 19, wherein the signing key is generated using a fuzzy extractor technique.

* * * * *